(12) United States Patent
Rybak et al.

(10) Patent No.: US 8,781,093 B1
(45) Date of Patent: Jul. 15, 2014

(54) REPUTATION BASED MESSAGE ANALYSIS

(75) Inventors: Alexander Rybak, Richboro, PA (US);
Patrick Moor, Menlo Park, CA (US);
Bradley Taylor, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 13/449,714

(22) Filed: Apr. 18, 2012

(51) Int. Cl.
*H04M 3/42* (2006.01)

(52) U.S. Cl.
USPC .................................. 379/210.02; 455/414.1

(58) Field of Classification Search
USPC ...................... 379/210.02, 210.03; 455/414.1
See application file for complete search history.

(56) References Cited

U.S. PATENT DOCUMENTS

| | | | |
|---|---|---|---|
| 2001/0019953 A1* | 9/2001 | Furukawa et al. | 455/420 |
| 2005/0041789 A1* | 2/2005 | Warren-Smith et al. | 379/93.24 |
| 2006/0112430 A1* | 5/2006 | Deisenroth et al. | 726/22 |
| 2007/0195753 A1 | 8/2007 | Judge et al. | |
| 2007/0201660 A1 | 8/2007 | Lan et al. | |
| 2008/0259918 A1 | 10/2008 | Walker et al. | |
| 2009/0082042 A1* | 3/2009 | Harendra et al. | 455/466 |
| 2010/0166159 A1 | 7/2010 | Katis et al. | |
| 2012/0008759 A1* | 1/2012 | Mcfeeters | 379/213.01 |
| 2012/0027191 A1* | 2/2012 | Baril et al. | 379/210.02 |
| 2012/0128144 A1* | 5/2012 | Chislett et al. | 379/201.01 |

OTHER PUBLICATIONS

Alexander Rybak; Global SPAM Filtering; http://googlevoiceblog.blogspot.com/2011/07/global-spam-filtering. html#!/2011/07/global-spam-filtering.html; Jul. 12, 2011.
Vincent Paquet; Helping you Fight Phone Spam; http://googlevoiceblog.blogspot.com/2009/03/helping-you-fight-phone-spam.html#!/2009/03/helping-you-fight-phone-spam.html; Mar. 20, 2009.
Mr. Number; Features; http://mrnumber.com/features; last viewed Apr. 17, 2012.

* cited by examiner

*Primary Examiner* — Fan Tsang
*Assistant Examiner* — Solomon Bezuayehu
(74) *Attorney, Agent, or Firm* — IP Spring

(57) ABSTRACT

Described herein are devices and techniques for detecting an inbound message (e.g., text, voice, voicemail) directed from an identifiable message sender to one of a collection of message recipients (e.g., by telephone numbers). The message is selectively forwarded to the message recipient's communication devices in response to a reputation score of the identifiable message sender. The devices and techniques described herein are further adapted to automatically determine or otherwise update the reputation score of the identifiable message sender, for example, in response to previously detected incoming messages. User preferences can be provided to override one or more of forwarding and blocking of detected messages regardless of any automatically obtained reputation score.

26 Claims, 5 Drawing Sheets

REPUTATION BASED MESSAGE ANALYSIS

BACKGROUND

Many telecommunication consumers are subjected to a continual barrage of message traffic. Personal communication devices, such as smart phones, allow individuals to be reachable virtually anywhere and at any time by various messaging vehicles. Examples of such messages include voice telephone calls, voice messages, and text-based messaging. Sorting through such message traffic can reduce personal productivity. Unwelcomed calls or messages that add to such traffic, such as unsolicited calls (e.g., spam), are a troublesome distraction.

SUMMARY

Described herein are devices and techniques for detecting a communication (e.g., text message, voice call, voicemail, etc.) directed to one of a collection of subscriber IDs associated with a subscriber (e.g., telephone numbers), and selectively forwarding the message to the target subscriber's communication device or devices based on a reputation score associated with the sender/initiator of the communication. The devices and techniques described herein may be further adapted for automatically determining or otherwise updating a reputation score for the sender/initiator of the detected message, for example, in response to patterns of previously-detected calls initiated by that sender. User preferences can be provided to allow for overriding programmatically determined handling preferences, regardless of a reputation score associated with a sender/initiator of a communication.

In some aspects, this disclosure provides a process for filtering messages. The process includes detecting an incoming message directed to a subscriber telephone number having been previously associated with at least one subscriber communications device. A sender of the incoming message is identified and a reputation score associated with the identified sender obtained. The incoming message is selectively forwarded to at least one subscriber communications device associated with the subscriber telephone number based on a reputation score associated with the identified sender. In at least some embodiments, the reputation score can be determined as a function at least in part of a number of calls made by the identified sender to telephone numbers that are unassigned to any subscriber.

In some aspects, this disclosure provides a system for filtering inbound messages directed to a subscriber telephone number associated with at least one subscriber communications device. The system includes a call forwarding processor for detecting an inbound message from an identifiable sender and for filtering the inbound messages as a function of a reputation score associated with the identifiable sender. Also included is a scoring engine configured to compute, for the detected message originating from the identifiable sender, the reputation score associated with the identifiable sender. A data storage device is provided in communication with the call forwarding processor and the scoring engine. The data storage device is configured to store an association between the identifiable sender and at least one of the computed reputation score and message statistics for inbound messages originating from the identifiable sender. The stored reputation score associated with the identifiable sender is retrievable by the call forwarding processor.

In some aspects, this disclosure provides a process for determining a reputation score of a message sender. The process includes detecting incoming messages received from a message sender. Each message is directed to a target subscriber identifier (ID) of a number of managed subscriber IDs of which at least some subscriber IDs are unassigned to any subscriber. For each of the incoming messages from the message sender, the process includes determining whether the target subscriber ID of the number of managed subscriber IDs is unassigned to any subscriber. A statistic associated with the message sender is evaluated. The statistic is a function of the determinations for the incoming messages from the message sender that the target subscriber ID is unassigned to any subscriber. A reputation score of the message sender is established based at least in part on the evaluated statistic.

Several of the methods described herein can provide for the automatic determination of unwelcomed messaging sources (such as spammers), e.g., by automatic detection of incoming messages and routing of unwelcomed messages responsive to a rule. Further, several of the methods described herein can be used to adaptively customize functionality to defend against spammers or account for the possibility of false positives; for example the methods do not depend on manual black listing of message sources.

DESCRIPTION

In the following detailed description of the various embodiments, reference is made to accompanying drawings, which form a part thereof, and within which are shown by way of illustration, specific embodiments, by which one or more of the devices, systems and techniques examples described herein may be practiced. It is to be understood that other embodiments may be utilized and structural changes may be made as appropriate.

Described herein are devices and techniques for detecting a message (e.g., text, voice, voicemail) directed to one of a collection of subscriber IDs (e.g., telephone numbers), and selectively forwarding the messages to the target subscriber's communication devices in response to the message sender's (source's) reputation (e.g., as may be determined by an associated reputation score). In some embodiments, the message is an incoming phone call and forwarding includes connecting the message source to the target subscriber. The devices and techniques described herein are further adapted for automatically determining or otherwise updating a reputation score of the sender of the detected message, for example, in response to detected calls. In at least some embodiments, user preferences are provided to allow for overriding one or more of forwarding, not forwarding, or otherwise blocking the forwarding of detected messages regardless of any automatically obtained reputation score.

Figure 1:
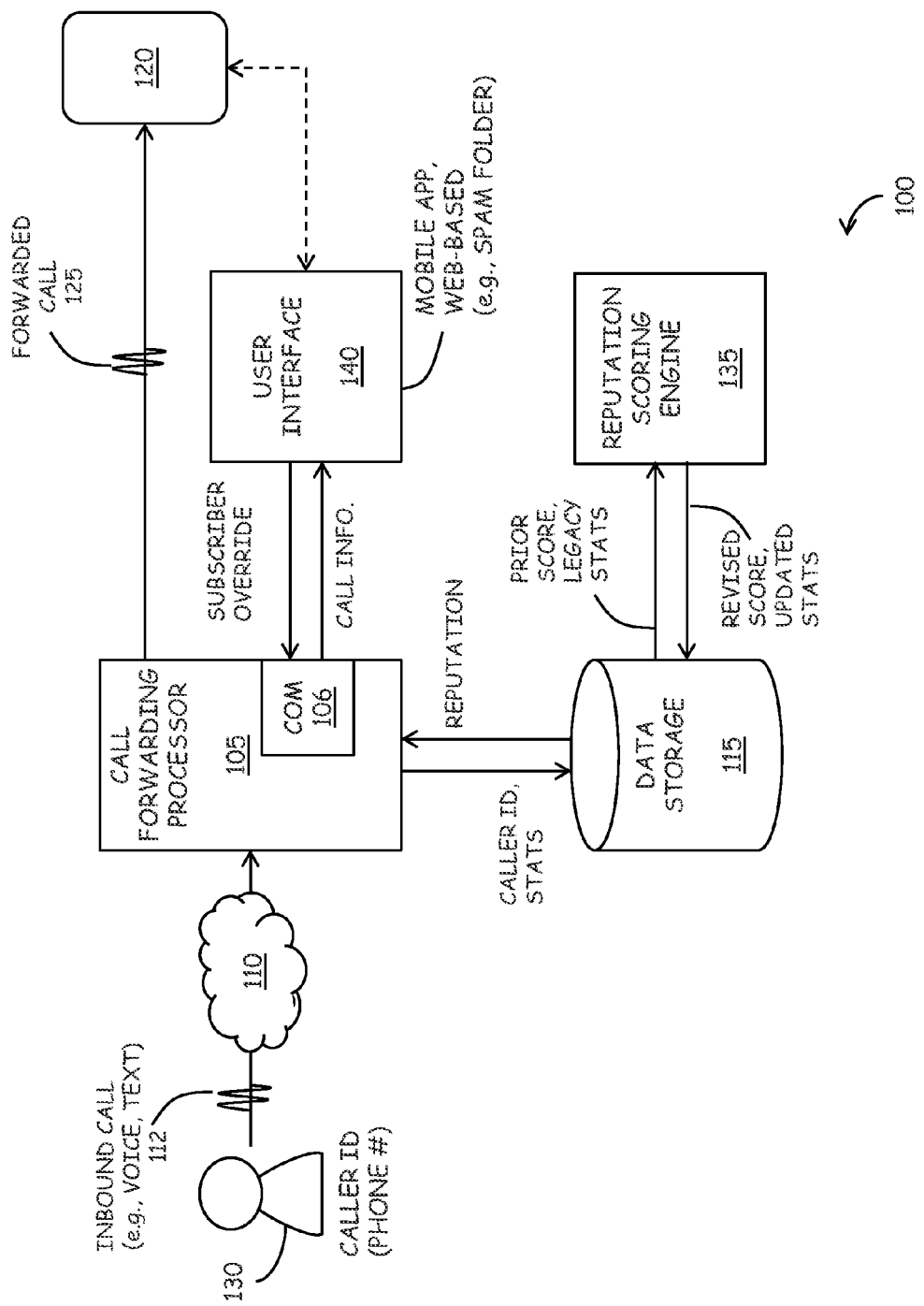
FIG. 1 shows a functional block diagram of an embodiment of a reputation based message forwarding system.

FIG. 1 shows a functional block diagram of an embodiment of a reputation based message forwarding system 100. The message forwarding system 100 includes a call forwarding processor 105 in communication with one or more communication networks 110. Messages are routed over the communication networks 110, from a messaging source (e.g., message sender), or caller 130, to an intended recipient (e.g., a target subscriber) according to a target subscriber's identification (ID). Such subscriber identification can include a subscriber's telephone number. Example communication networks 110 include the public switched telephone network, cellular networks, local area networks, metropolitan networks, and the Internet. Messages can include one or more of voice messages, such as Voice over IP (VoIP); voicemail messages; text messages, such as Short Message Service (SMS) messages; messages that include one or more of audio, video and images, such as Multimedia Messaging Service (MMS) and the like.

The call forwarding processor 105 detects inbound messages 112 directed to a managed target subscriber ID and selectively forwards the messages 112 to the target subscriber's communication device 120 associated with the target subscriber's ID in response to a reputation score associated with the message sender. In some embodiments, the message forwarding service provider obtains a large block of subscriber IDs (e.g., telephone numbers). The service provider then provides subscribers with a designated one of the subscriber IDs for their message forwarding service, and associates any subscribers with one or more of the managed IDs. For any such IDs associated with a subscriber, the call forwarding processor 105 selectively forwards the detected message 125 to a subscriber's communication device 120. Subscriber communication devices 120 can include telephones, including mobile devices, such as smart phones and tablets. Other subscriber devices include computers and more generally, web-enabled communication devices. In some embodiments, a subscriber has more than one communication device 120, such as a mobile phone 120 and a computer (not shown). It is understood that in such scenarios, the message forwarding service provider may choose to selectively forward a message to more than one such subscriber device.

At least some messaging protocols include caller identification (ID). For example, a caller-initiated message (e.g., an "inbound" call) transmitted across the one or more networks 110 includes a unique caller ID associated with the caller 130. For public switched telephone protocols, an inbound call includes the caller's telephone number, which is sent to the called party's telephone equipment during the ringing signal, or when the call is being set up but before the call is answered. Where available, caller ID can also provide a name associated with the calling telephone number. The information made available to the called party may be displayed on a telephone's display or on a separately attached device. Such caller IDs can also be used by the call forwarding processor 105 to determine whether the message sender (e.g., caller) has been identified as an unwelcomed caller.

In at least some embodiments, the message forwarding system 100 selectively forwards messages 125 to a subscriber's communication device 120 in response to the caller's associated reputation score. Namely, if the caller 130 was previously determined to be an unwelcomed or otherwise undesirable caller (e.g., a "spammer"), the caller 130 can be associated with a reputation score suggestive of such status. The call forwarding processor 105 can be configured to identify the reputation score and to not forward the message to the subscriber's communication device 120. Alternatively or in addition, the call forwarding processor 105 can be configured to forward a notification to the subscriber's communication device 120 that such a call 112 was blocked. For example, a notification of a blocked call can include one or more details, such as the caller's ID, the date and time of the call, etc. In at least some embodiments in which such notifications are provided to the subscriber's communication device 120, the subscriber can be provided with an option to override, thereby allowing delivery of the message 125. In such embodiments, provisions for at least temporarily storing such detected messages, such as the electronically accessible storage 115, are also provided.

Associations of reputation scores with message sender identifiers (e.g., caller IDs) can be stored in the datastore, or data storage device 115, for example, as a table of associations between caller IDs and reputation scores. The datastore 115 can be any suitable device or service capable of storing or otherwise retaining information such as reputation scores, associates of such scores with callers, call histories, statistics, and the like. Such devices can include electronic storage devices, such as RAMs, ROMs, EEPROMS, and the like. Other such datastore devices can include magnetic storage devices and optically accessible storage devices, such as CDROMs. In at least some embodiments, reputation scores can be categorized, such as "spammer," "unknown," "trusted," etc. Alternatively or in addition, such reputation scores can be identified by a numeric score (e.g., a numeric value within a range of values), or other suitable identifier. In some embodiments, a reputation score indicates the likelihood that the given caller is not a spammer. For example, with such a scoring scheme, callers with low reputation scores are more likely than not to be spammers. In response to detecting an inbound call 112, the call forwarding processor 105 obtains the caller's ID. The call forwarding processor 105 can obtain or otherwise consult previously stored associations available within the datastore 115, to determine whether a reputation score has been associated with the caller's ID. If so, the call forwarding processor 105 can implement one or more rules to selectively forward inbound calls 112 in response to the caller's associated reputation score. In some embodiments, the reputation score is stored in the form of a numeric value (e.g., on a scale of 1-10). With such scoring techniques, one end of a scoring scale (e.g., 10) generally represents less desirable callers. In such instances, a forwarding rule can be configured to forward only those messages having a score of less than some threshold score (e.g., 8). In some implementations, such a threshold score is settable, for example, by a user to allow for a tailored or otherwise tolerance-based filtering.

Such reputation scores can be pre-assigned, for example, knowing that a particular caller ID is associated with a known spammer or otherwise generally accepted unwelcomed caller. In the illustrative embodiment, the system 100 includes a reputation scoring engine 135 in communication with the datastore 115. It should be understood that reference to communication provided herein is provided without limitation unless sated otherwise. Such manner of communication includes wired communications (e.g., twisted pair, coaxial cable, wired networking), wireless (e.g., RF, microwave, wireless networking), optical (e.g., fiber optic, free-space optical, infrared), acoustic and combinations of such different manners of communication. In operation, the call forwarding processor 105 detects an incoming message directed to a target subscriber's ID (e.g., telephone number). For example, a message forwarding service provider can manage a group or pool of such IDs (e.g., telephone numbers), establishing associations between telephone numbers and subscribers of the message forwarding service. The call forwarding processor 105 receives a message sender identifier, such as obtained by caller ID for telephone calls, and queries storage to determine the availability of any reputation score for the identified message sender. The call forwarding processor 105 selectively forwards the message to the subscriber's device 120 according to reputation-based rules pre-established in the call forwarding processor 105 (e.g., forward unless message sender's reputation score is indicative of an unwelcomed caller).

In at least some embodiments, the call forwarding processor 105 updates a call log retained within the datastore 115. The call log can include various attributes of a detected call, such as the message sender's identity, the time of the call, the intended recipient's identity, etc. The reputation scoring engine 135 can be configured to periodically review information retained in the datastore 115, such as the call log, prior scores, legacy statistics, etc., to obtain evidence as to each identified message sender's reputation score. For example, the reputation scoring engine 135 can implement an algorithm to compute or otherwise determine a score (e.g., a numeric value) indicative of a message sender's likelihood to be an unwelcomed caller. Such a likelihood can be determined according to a probability based on one or more caller attributes, such as call history, caller ID, caller statistics, and the like. The reputation scoring engine 135 updates such revised scores, updated statistics, or other indication of reputation in a reputation association also stored within storage 115. Such updated reputation scores can be used by the call forwarding processor 105 in selectively routing subsequent messages. In some embodiments, the reputation scoring engine 135 updates such revised scores each time the message sender calls any one of the subscriber IDs, regardless of whether the called subscriber ID has been designated to a particular subscriber, or remains undesignated. Alternatively or in addition, the reputation scoring engine 135 updates such revised scores each time the message sender calls one of the subscriber IDs that has not been provided or otherwise designated to a subscriber. In at least some embodiments, the reputation scoring engine 135 updates such revised scores automatically, e.g., without human intervention.

Figure 2A:
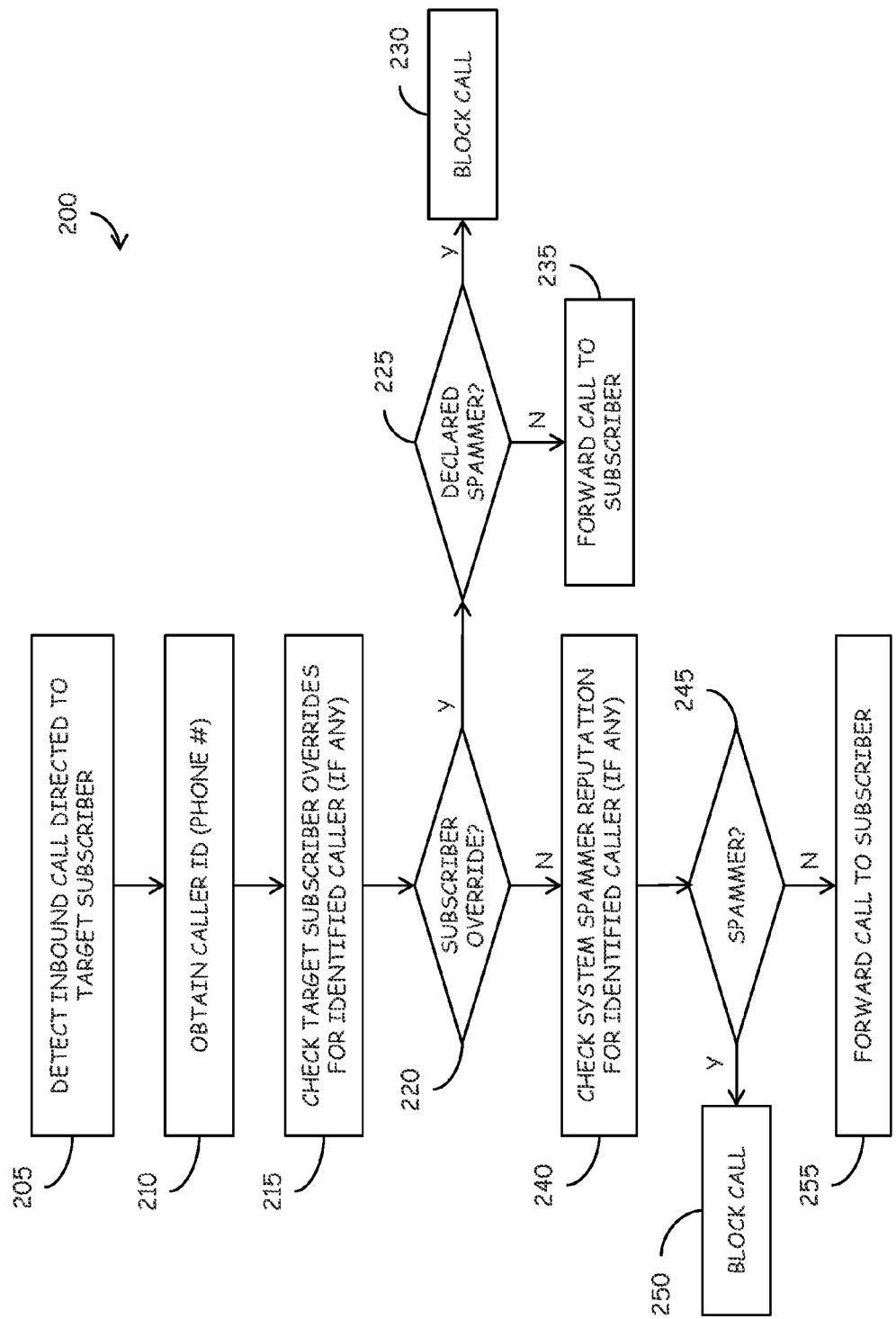
FIG. 2A shows a flowchart of an embodiment of a process for implementing a reputation based message forwarding system.

FIG. 2A shows a flowchart of an embodiment of a process for implementing reputation based message forwarding 200. An inbound call directed to target subscriber's ID is detected at 205, e.g., by the call forwarding processor 105 (FIG. 1). A caller ID associated with the detected call is determined at 210, for example by a caller ID feature. The existence of any subscriber overrides for the identified caller is determined at 215. In response to determining the existence of such an override, it is next determined whether the override reputation score should be blocked at 225, e.g., the caller having been previously declared by a subscriber as undesirable. In response to determining that the caller's reputation score is undesirable (e.g., as a "spammer"), the call is blocked at 230. Alternatively, in response to determining that the caller's reputation score is not undesirable, the call is forwarded to the subscriber's communication device at 235.

Upon determining the non-existence of any such subscriber overrides, the caller ID's reputation score is next obtained at 240. For example, a system-wide reputation score for a given caller ID can be maintained by the message forwarding system 100. After having obtained any such system-wide reputation score for the caller ID, it is next determined according to the reputation score, whether the message should be blocked at 245. In response to determining that a caller's reputation score is indicative of an unwelcomed caller, the call is blocked or otherwise not forwarded at 250. Alternatively, in response to determining that the caller's reputation score is indicative that the caller is not unwelcomed, the call is forwarded to the subscriber's communication device at 255.

In response to blocking a call at either 230 or 250, such blocked calls can be directed, in some embodiments, to a voice messaging system. Alternatively or in addition, the blocked calls can be simply terminated by the call forwarding processor 105 or otherwise not forwarded anywhere. In some embodiments, handling of blocked calls at 230 or 250 can be accomplished by the call forwarding processor 105 according to the caller's reputation score. For example, a reputation score indicative of a caller being a mildly unwelcomed caller can result in the call forwarding processor 105 blocking the call and directing the call to a voice messaging system, for example, allowing a subscriber to review the blocked call at a later time. Likewise, a reputation score indicative of a caller being a strongly unwelcomed caller, e.g., a "worst spammer," can result in the call forwarding processor 105 blocking the call by nether forwarding to the subscriber or to a voice messaging system.

Figure 2B:
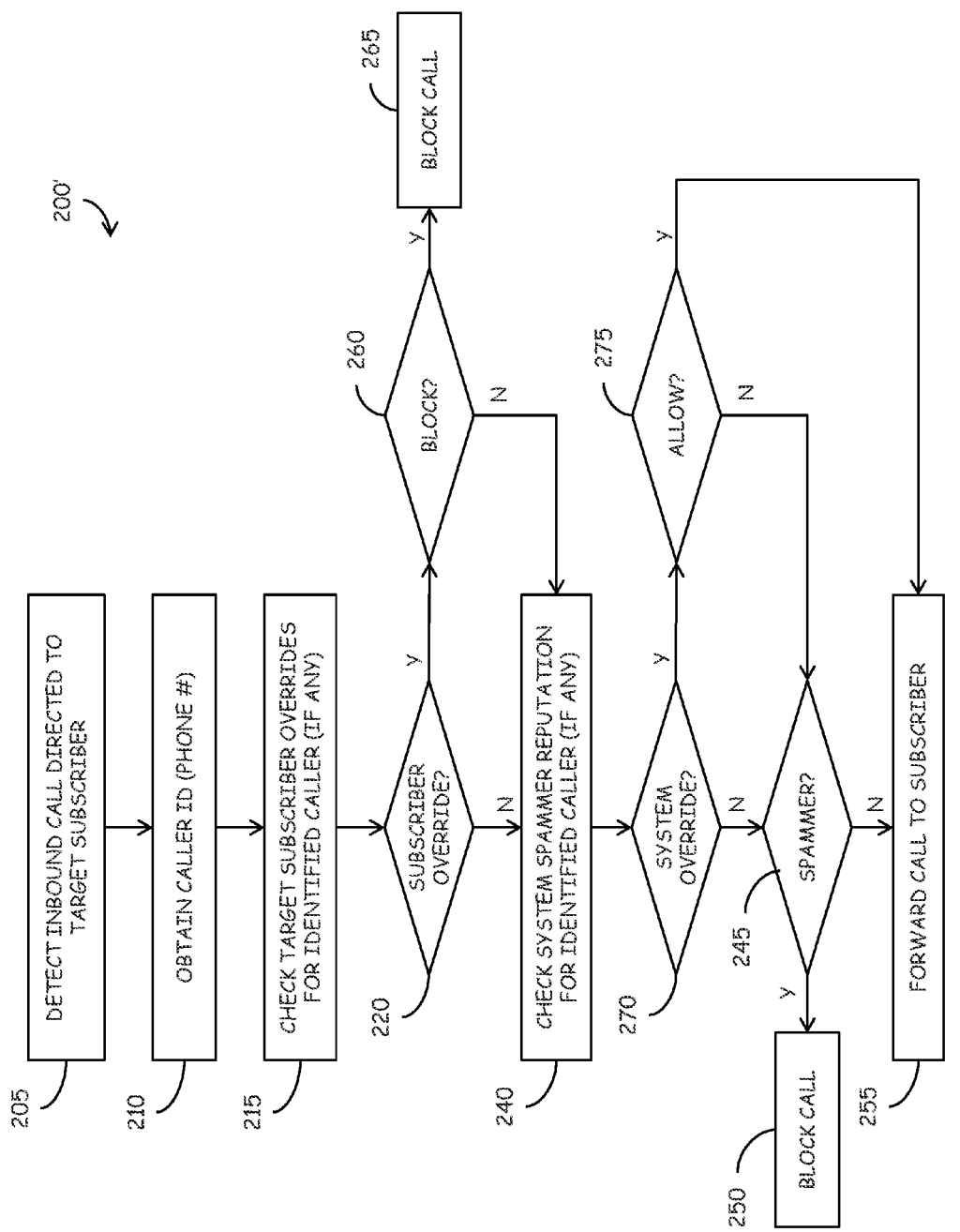
FIG. 2B shows a flowchart of an alternative embodiment of a process for implementing a reputation based message forwarding system.

FIG. 2B shows a flowchart of an alternative embodiment of a process for implementing reputation based message forwarding 200'. In this embodiment, an inbound message or call directed to target recipient (e.g., subscriber's ID) is detected at 205, for example, by a call forwarding processor at 105 (FIG. 1). A message sender identifier, such as a caller ID, associated with the detected call is determined at 210. The existence of any subscriber overrides for the identified caller is determined at 215. In response to a determination of any such an override at 220, it is further determined at 260, whether the subscriber has associated an override reputation score as an unwelcomed caller (e.g., as a "spammer") that should be blocked at 265. In this embodiment, the call is blocked regardless of any system-wide or other such characterization or lack thereof, if the caller has been designated by the target subscriber as an unwelcomed caller. In the absence of any such override, the caller's reputation score is obtained at 240. For example, a system-wide reputation score for a given caller ID can be maintained by data storage 115 (FIG. 1). After having obtained any such system-wide reputation score for the caller ID, it is determined at 270 whether the subscriber has associated an override reputation score as a welcomed caller that should be allowed at 255. In this embodiment, the call is forwarded by the call forwarding processor at 105 to the subscriber's communication device regardless of any system-wide or other such characterization or lack thereof of the caller as an unwelcomed caller. In the absence of any such override, the caller ID's system-wide reputation score is obtained at 245. According to the caller's reputation score, the call is forwarded at 255 or blocked at 250 by the call forwarding processor at 105. It should be understood that the order of events such as determining a user-designated reputation at 220 and a system-wide reputation at 270 is not necessarily important. Namely, any identification as a spammer, be it user-designated or system-wide can result in an override. For example, if using a "whitelist," e.g., allowed callers first, then there is no need to check a "blacklist," e.g., unwelcomed callers.

Figure 3:
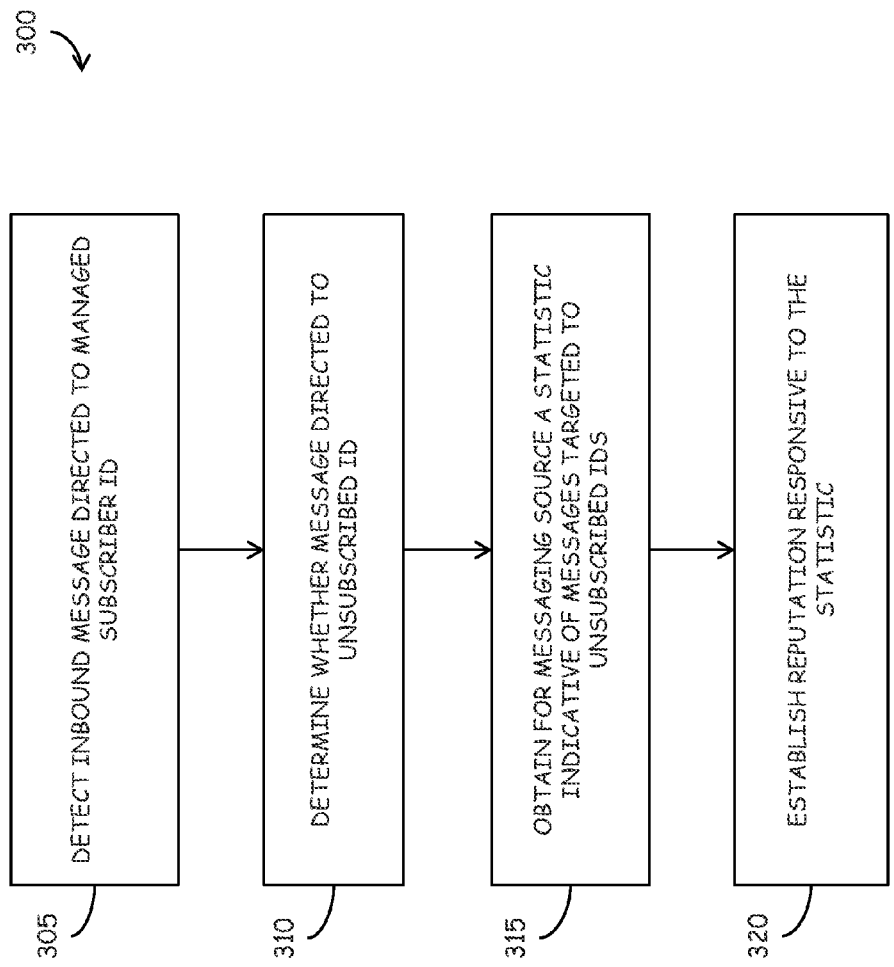
FIG. 3 shows a flowchart of an embodiment of a process for maintaining a reputation based message forwarding system.

FIG. 3 shows a flowchart of an embodiment of a process for maintaining a reputation score based message forwarding filter 300. The process 300 includes detecting an inbound message (e.g., a telephone call) directed to a managed caller ID (e.g., a telephone number) at 305. It is next determined whether the inbound message is directed to a subscriber ID not associated with a subscriber at 310. Such calls not directed to an individual subscriber are suggestive that the call may have been initiated at random, or by an automated service, or by an individual lacking an actual relationship with the intended recipient, or by any person or machine attempting to send unsolicited messages to large numbers of subscribers. Accordingly, such calls provide evidence that the message sender may be an unwelcomed caller.

Allowing for the possibility of calls with an unintended erroneous subscriber ID (e.g., a "wrong number"), certain statistics can be maintained and otherwise updated in response to such calls. For example, caller statistics can be maintained for a particular caller at 315. In the illustrative example, such statistics can track particulars of calls placed to such unsubscribed numbers. Namely, if a particular caller happens to make a larger number of such calls to unsubscribed numbers, it is suggestive that the caller is practicing spamming. Other caller statistics alone or in combination with determination that the caller has attempted to reach an unsubscribed subscriber ID can be used as an indication of a caller's undesirable reputation score. For example, even though a caller may not place a large number of calls, or even a single call, to an unsubscribed subscriber ID, particular calling patterns can be suggestive of a caller's unwelcomed reputation score. Such patterns can include a large volume of messages from a single message sender; a large volume of messages from a single message sender, that are also directed to a relatively large number of message recipients, or subscribers (e.g., more than some threshold value); the timing of such calls, including time a call is placed, its duration and time between successive calls. In at least some embodiments, such timing and volume can be accounted for or otherwise accompanied by a call rate (e.g., calls per hour). Such information as called numbers, calling frequency and/or other calling pattern features can be used by a reputation scoring engine 135 (FIG. 1) to provide or otherwise update a reputation score of an associated caller. Thus, a reputation score can be a function of one or more of such parameters. In some embodiments, one or more of the parameters are provided to a classifier, e.g., a statistical classifier such as a neural network, naive Bayes, decision tree, or other ensemble classifier. The classifier can be used to provide a reputation score.

A reputation score of a message sender (e.g., caller ID) based on calling patterns, such as those described above, is obtained at 320. For example, a caller identified as unwelcomed according to any of the example indications discussed herein can be associated with a reputation score indicative of the unwelcomeness of such a caller. Less welcome callers are associated with a reputation score or other suitable identifier indicative of such status. As indicated above, such a reputation score can be obtained within a range of scores. An association of one of a score and a reputation for each caller is established or otherwise updated and stored within datastore 115 (FIG. 1) at least for the benefit of the call forwarding processor 105.

In at least some embodiments, a caller ID is associated with a baseline reputation score. Such a baseline reputation score can be associated with a previously unknown caller ID at the time of an initial call. In the instance of a spammer that may call repeated numbers at random, or according to some algorithm, the caller's reputation score can be updated with each subsequent call. For example, in response to a subsequent call, the caller ID is identified as not undesirable. However, in observing calling patterns suggestive of a spammer, the caller ID's reputation score is modified, for example, in each instance becoming more suggestive that the caller is a spammer and therefore undesirable.

In some embodiments, such reputation analyses are determined substantially in real time in association with each call. Alternatively or in addition, such reputation analyses are determined according to a schedule, such as once an hour, once a day, once a week, and the like. In such instances, the reputation scoring engine 135 (FIG. 1) updates electronically accessible storage 115 (FIG. 1) to include a caller's reputation score.

Figure 4:
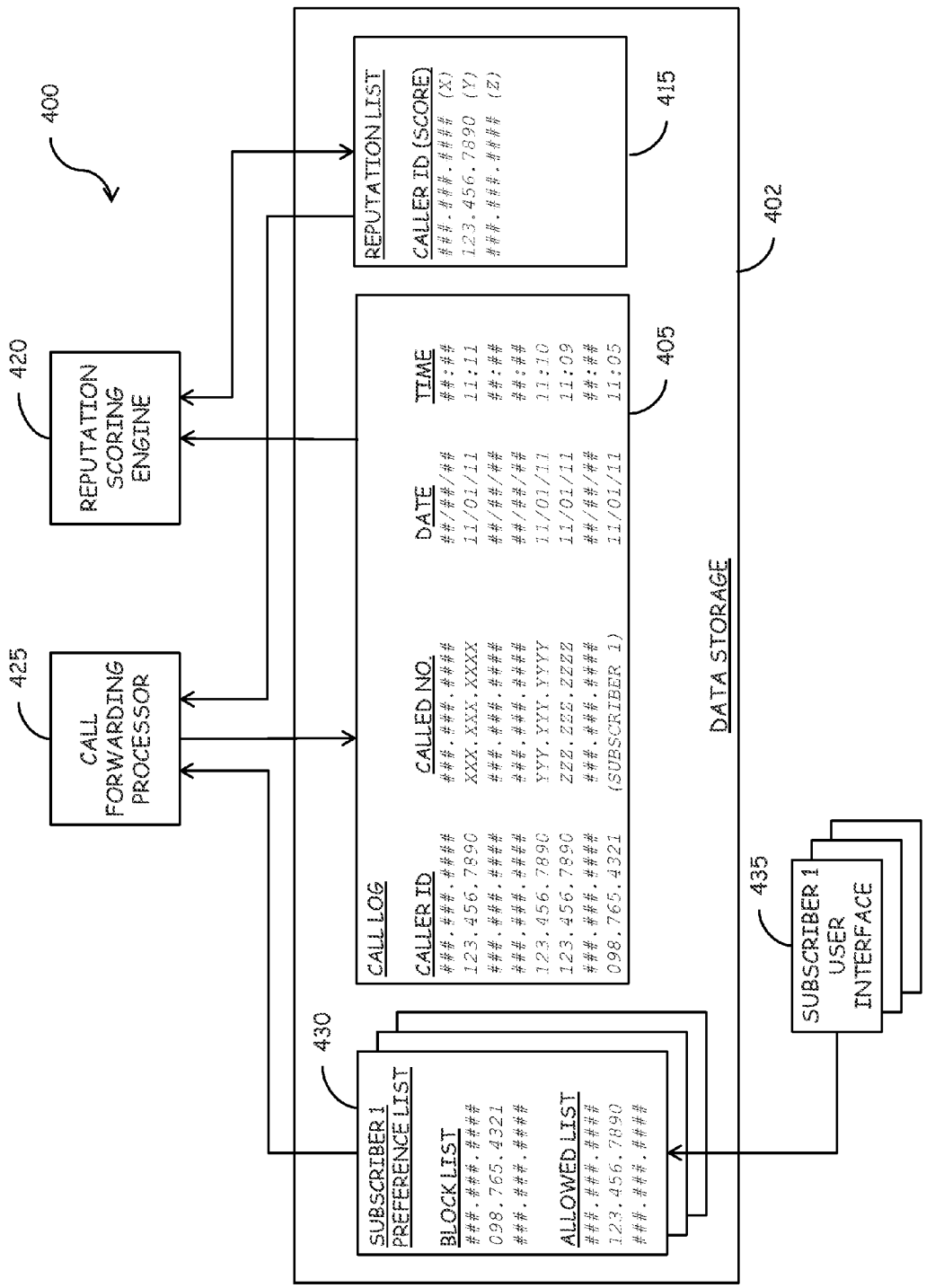
FIG. 4 shows a functional block diagram of an embodiment of a reputation based message forwarding system.

FIG. 4 shows a functional block diagram of an embodiment of a reputation based message forwarding system 400, or telephone spam filter. Electronically accessible storage 402 is illustrated as storing data indicative of a call log 405, a respective subscriber preference list 430 for each message-forwarding service subscriber, and a system-wide reputation score list 415. The example call log 405 can be stored as a table, as shown, including a message sender identifier, such as a caller's telephone number, a message recipient's identifier, such as a target subscriber ID, and perhaps one or more other attributes of the call, such as the date, time, etc.

An example subscriber preference list 430 includes a list of blocked caller IDs, such as blocked telephone numbers. Alternatively or in addition, the example subscriber preference list 430 includes a list of allowed caller IDs, such as allowed telephone numbers. The system-wide reputation score list 415 includes an association of caller ID (e.g., telephone number) with reputation score, or status (e.g., unwelcomed, "spammer").

In the illustrative example, each of the subscriber preference lists 430 can be updated in response to a respective subscriber's user interface 435. Referring briefly to FIG. 1, a subscriber interface 140 is in communication between a subscriber's communication device 120 and the call forwarding processor 105. Alternatively or in addition, the subscriber interface 140 is in communication between a subscriber's communication device 120 and electronically accessible storage 115. Such a subscriber interface 140 can be maintained according to a client-server model, in which a user client is resident upon the user's communication device 120, such as a computer, a tablet or smart phone. A web-server portion of the user interface 435 is provided on a web server, such as the call forwarding processor 105, maintained by the message forwarding service provider. In at least some embodiments, the user interface 435 includes a web-based application, for example, including executable code, such as JAVA script, transmitted by the communications module 106 (FIG. 1) to the subscriber web-accessible device 120 (FIG. 1). For example, the user interface 435 can include access options allowing a user to retrieve stored blocked messages.

Referring again to FIG. 4, the call forwarding processor 425 is configured to read information from each of the subscriber preference list 430 and the system-wide reputation score list 415 and to selectively write information to the call log. In at least some embodiments, a reputation scoring engine 420 is configured to read information from the call log 405 and to selectively write information to the system-wide reputation score list 415. Each of the call forwarding processor 425 and the reputation scoring engine 420 can be configured to implement procedural steps to implement reputation based message forwarding, such as the example processes described herein, obtaining a caller's reputation score according to one or more of a score determined from a caller's calling patterns or statistics and override characterizations of the caller from one or more subscribers (characterization of a caller as unwelcomed by many subscribers can provide strong evidence that the caller is a spammer, worthy of a system-wide characterization). For example, each of the call forwarding processor 425 and the reputation scoring engine 420 can be implemented in a dedicated processor. Alternatively or in addition, one or more of the call forwarding processor 425 and the reputation scoring engine 420 can be implemented in a general purpose processor executing a sequence of preprogrammed instructions. As such, one or more of the procedural instructions described herein or equivalents thereto can be stored on a computer readable medium, such as a random access memory (RAM), a disk, such as an optical disk, and magnetic media, such as magnetic disk or tape.

In an illustrative example, referring to FIG. 4, a call initiated from caller "098.765.4321" is detected by the call forwarding processor 425 at 11:05 on Nov. 1, 2011. The call forwarding processor 425 updates the call log 405 to record such details as the sender, the target subscriber ID and the date and time of the call, as shown. The call forwarding processor 425 then consults each of the subscriber preference list 430 associated with "subscriber 1" as determined from the target subscriber ID of the detected call and the system-wide reputation score list 415. Depending upon one or more rules pre-programmed, for example, into the call forwarding processor 425, such as the rules illustrated in one or more of FIG. 2A and FIG. 2B, the call forwarding processor 425 selectively forwards the call to the target subscriber's communication device. The process is similarly repeated for subsequent calls. As described herein, whether a call is forwarded or not can depend upon a reputation score associated with the caller.

At least periodically, the reputation scoring engine 420 reads information from the call log 405, and in at least some embodiments, from the reputation list 415. The reputation scoring engine 420 implements pre-programmed instructions, such as the rules illustrated in FIG. 3, to determine or otherwise update a reputation score of each of the callers for which a reputation score is maintained, for example, by writing a score (or a revised score) to the reputation list 415. In at least some embodiments, such reputation score is maintained as a score. Such scores can span a range, for example, taking on any value within the range, e.g., between 1 and 10, between 1 and 100, and the like. In some embodiments, such a score represents a binary value, for example, a "1" indicating that a caller is a spammer and a "0" indicating that the caller a non-spammer. Such a binary score, or simply a flag, can be determined, for example, automatically according to some call feature, such as interaction of a caller with unassigned numbers. Thus, a record can maintained as to a number of times a particular caller called an unassigned number.

By way of further example, a score, such as a binary score indicating whether a caller is a spammer or not, can be established according to a rule. An example of such a rule is setting a caller's score to be suggestive of a spammer, responsive to detecting that the caller made a number of calls to unassigned numbers exceeding some threshold value, such as 1 or perhaps 5 or 10 or more. It is conceivable, that tracking of such calls can be performed over some designated time period, such as a number of hours, a day, a week, a month, or more, such that a number of calls occurring within the designated time period exceeding the threshold results in a score indicative of a spammer, while the same number of calls not occurring within the designated time period does not.

Whereas many alterations and modifications of the systems, devices and techniques described herein will no doubt become apparent to a person of ordinary skill in the art after having read the foregoing description, it is to be understood that the particular embodiments shown and described by way of illustration are in no way intended to be considered limiting. Further, the systems, devices and techniques have been described with reference to particular preferred embodiments, but variations within the spirit and scope of the disclosure will occur to those skilled in the art. It is noted that the foregoing examples have been provided merely for the purpose of explanation and are in no way to be construed as limiting. Other embodiments are within the scope of the following claims.

We claim:

1. A computer-implemented method for filtering messages, the method comprising:
   detecting an incoming message directed to a subscriber telephone number, the subscriber telephone number having been previously associated with at least one subscriber communications device, and the subscriber telephone number being one of a plurality of managed telephone numbers of which at least some telephone numbers are unassigned to any subscriber for any service;
   identifying a sender of the incoming message;
   obtaining a reputation score associated with the identified sender, the reputation score determined as a function at least in part of a number of calls made by the identified sender to telephone numbers of the plurality of managed telephone numbers that are unassigned to any subscriber for any service, a duration and time between successive calls made by the identified sender, and a ratio of calls to unassigned telephone numbers to calls placed; and
   selectively forwarding the incoming message to at least one subscriber communications device associated with the subscriber telephone number, based on the reputation score associated with the identified sender.

2. The computer-implemented method of claim 1, wherein the identifier comprises a telephone caller ID.

3. The computer-implemented method of claim 1, wherein obtaining a reputation score associated with the identified sender comprises retrieving the reputation score associated with the identified sender from a datastore comprising reputation scores for a plurality of senders.

4. The computer-implemented method of claim 3, further comprising updating the reputation score associated with the identified sender in the datastore.

5. The computer-implemented method of claim 1, wherein obtaining a reputation score comprises obtaining a subscriber-specific override reputation score associated with the subscriber telephone number.

6. The computer-implemented method of claim 1, wherein obtaining a reputation score comprises computing the reputation score.

7. The computer-implemented method of claim 1, wherein selectively forwarding comprises not forwarding the incoming message for which the obtained reputation score is indicative of an unwelcomed caller, otherwise forwarding the incoming message to the at least one subscriber communications device associated with the subscriber telephone number.

8. The computer-implemented method of claim 7, further comprising, for the incoming message that is not forwarded, sending an indication to at least one subscriber communications device associated with the subscriber telephone number that the incoming message was not forwarded.

9. The computer-implemented method of claim 7, wherein not forwarding the incoming message comprises directing the incoming message to a voice recorder.

10. The computer-implemented method of claim 1, wherein obtaining a reputation score associated with the identified sender comprises:
    updating a call history of the identified sender of the detected incoming message;
    evaluating a probability associated with the identified sender, which is based on the call history; and
    updating the reputation score of the identified sender according to the probability.

11. The computer-implemented method of claim 1, wherein the reputation score is also a function of frequency of calls blocked by subscribers.

12. A system for filtering inbound messages directed to a subscriber telephone number associated with at least one subscriber communications device, the system comprising:

a call forwarding processor for detecting an inbound message from an identifiable sender and for filtering the inbound messages as a function of a reputation score associated with the identifiable sender, the reputation score determined as a function at least in part of a number of calls made by the identifiable sender to telephone numbers of a plurality of managed telephone numbers that are unassigned to any subscriber for any service, a duration and time between successive calls made by the identified sender, and a ratio of calls to unassigned telephone numbers to calls placed;

a scoring engine configured to compute, for the detected message originating from the identifiable sender, the reputation score associated with the identifiable sender; and a data storage device in communication with the call forwarding processor and the scoring engine, the data storage device configured to store an association between the identifiable sender and at least one of the computed reputation score, and message statistics for inbound messages originating from the identifiable sender, the stored reputation score associated with the identifiable sender being retrievable by the call forwarding processor.

13. The system of claim 12, further comprising a communications module in communication with at least one of the call forward processor and the scoring engine for transmitting and receiving information with a user interface that permits a user having a subscriber telephone number to manage selective forwarding of the detected inbound message, wherein the call forwarding processor is configured to block detected inbound messages based on at least one of the computed reputation score and a user preference associated with the identifiable sender.

14. The system of claim 12, wherein the inbound messages are selected from the group consisting of: voice messages, voicemail messages, text messages, and combinations thereof.

15. The system of claim 12, wherein the user interface comprises a mobile application operable from the subscriber communications device.

16. The system of claim 12, wherein the user interface comprises a web-based application operable from a subscriber web-accessible device, the web-based application comprising executable code transmitted by the communications module to the subscriber web-accessible device.

17. The system of claim 12, wherein the identifiable sender comprises is a telephone caller ID.

18. The system of claim 12, wherein the user interface comprises access options to retrieve stored blocked messages.

19. The system of claim 12, wherein the user interface comprises an indication as to whether an inbound message was blocked.

20. The system of claim 12, wherein the user interface comprises a user-settable override parameter for at least one of blocking and forwarding detected inbound messages regardless of the obtained reputation score.

21. A computer-implemented method for determining a reputation score of a message sender, comprising:

detecting incoming messages received from a message sender, each message being directed to a target subscriber identifier (ID) of a plurality of managed subscriber IDs, at least some subscriber IDs of the plurality of managed subscriber IDs being unassigned to any subscriber for any service;

determining, for each of the incoming messages from the message sender, whether the target subscriber ID of the plurality of managed subscriber IDs is unassigned to any subscriber for any service;

evaluating a statistic associated with the message sender, the statistic being a function of the determinations for the incoming messages from the message sender that the target subscriber ID is unassigned to any subscriber for any service, a duration and time between successive calls made by the message sender, and a ratio of calls to unassigned telephone numbers to calls placed; and establishing a reputation score of the message sender based at least in part on the evaluated statistic.

22. The computer-implemented method of claim 21, wherein the statistic comprises a ratio of the historical aggregate of messages from the message sender directed to unassigned managed subscriber IDs of the plurality of managed subscriber IDs, and a historical aggregate of messages from the message sender directed to managed subscriber IDs of the plurality of managed subscriber IDs assigned to respective subscribers.

23. The computer-implemented method of claim 21, wherein the reputation score is indicative of whether the message sender is an unwelcome message sender.

24. The computer-implemented method of claim 21, wherein a reputation score of a previously unknown message sender is assigned an initial reputation score.

25. The computer-implemented method of claim 21, wherein the statistic is also a function of one or more of:

incoming message frequency; incoming message volume; incoming message call patterns; and reputation score indicator prescribed from subscribers.

26. The computer-implemented method of claim 21, wherein the subscriber ID comprises a telephone number.

* * * * *